(12) United States Patent
Troutman et al.

(10) Patent No.: US 7,503,280 B2
(45) Date of Patent: Mar. 17, 2009

(54) INTEGRATED PET ENVIRONMENT FOR A MOBILE VEHICLE

(75) Inventors: Lisa Troutman, Rochester, MN (US);
David Musso, Houston, TX (US);
Melissa R. Appel, Pittsburgh, PA (US);
Edwin K. Chan, Wilmington, DE (US);
Elijah Dobrusin, Marblehead, MA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 14 days.

(21) Appl. No.: 11/399,087

(22) Filed: Apr. 6, 2006

(65) Prior Publication Data

US 2006/0254525 A1 Nov. 16, 2006

Related U.S. Application Data

(60) Provisional application No. 60/669,637, filed on Apr. 7, 2005.

(51) Int. Cl.
*A01K 29/00* (2006.01)
(52) U.S. Cl. .................. 119/28.5; 119/847; 296/24.31; 296/69

(58) Field of Classification Search ............... 119/28.5, 119/771, 482, 496, 847; 297/188.01, 188.04, 297/354.13; 296/190.02, 65.16, 37.15, 69, 296/24.31
See application file for complete search history.

(56) References Cited

U.S. PATENT DOCUMENTS

| 6,027,164 | A * | 2/2000 | Jakubiec et al. | 297/188.01 |
| 6,702,375 | B1 * | 3/2004 | Laskowski et al. | 297/188.07 |
| 2005/0040689 | A1 * | 2/2005 | Henning | 297/354.13 |
| 2005/0161974 | A1 * | 7/2005 | Atcravi | 296/164 |

* cited by examiner

*Primary Examiner*—T. Nguyen
(74) *Attorney, Agent, or Firm*—Mark C. Bach; Jeffrey P. Calfa

(57) ABSTRACT

An integrated pet environment for a mobile vehicle. The integrated pet environment will consist of two pet care units, one located behind the driver's seat and the other located behind the passenger's seat. The driver's seat unit will have storage for pet supplies, and will have a gate which the driver can easily reach with one hand while driving to close off his/her seat, preventing the dog from disturbing him/her while he/she is driving. The passenger's seat unit will have more storage plus a ramp for the dog. The passenger's seat itself will fold all the way down forward and will provide a seat for the dog, accessible from the back of the truck, which will not allow the dog to reach the driver. One of the two storage units will also have food and water dishes.

15 Claims, 4 Drawing Sheets

INTEGRATED PET ENVIRONMENT FOR A MOBILE VEHICLE

This patent issues from a non-provisional patent application claiming the priority of provisional patent application Ser. No. 60/669,637, filed Apr. 7, 2005.

BACKGROUND

Trucks carry a bulk of the goods within the United States. Driver's have a difficult lifestyle in which they spend much of their time within the cab and sleeper of their over the road tractor trailers. The truck becomes their home away from home. One issue concerning driver satisfaction is the loneliness of traveling across the country without companionship. One solution to this would be to for drivers to be accompanied by their pet dogs. Pet Friendly Trucking would better accommodate the needs of a truck driver traveling with a pet. Companionship of a pet addresses issues such as driver boredom, loneliness, security, and health thus making the truck more like home. There is a need for an integrated environment that would maintain the communication between the pet and the driver while improving the safety of both. No system currently available maintains pet mobility, while protecting the driver from distraction by keeping the pet at a safe distance.

According to the American Society for the Prevention of Cruelty to Animals (ASPCA) and the Humane Society, there are currently no laws restricting pet travel in moving vehicles, except for California's new law requiring seat belts for pets, and the prohibition of pets traveling in the flat bed of a truck. These societies both ask only that the pet be restrained when the vehicle is moving and that the truck driver take proper care of the animal. Further, they reason that the pet is probably better off in the truck with the driver than at home alone. This solution of this invention addresses pet restraint, pet and driver safety, storage, entertainment, and odors.

SUMMARY

This invention relates to an integrated pet environment for a mobile vehicle such as a highway tractor trailer with a sleeper compartment. The integrated pet environment will consist of two pet care units, one located behind the driver's seat and the other located behind the passenger's seat. The driver's seat unit will have storage for pet supplies, and will have a gate which the driver can easily reach with one hand while driving to close off his/her seat, preventing the dog from disturbing him/her while he/she is driving. The passenger's seat unit will have more storage plus a ramp for the dog. The passenger's seat itself will fold all the way down forward and will provide a seat for the dog, accessible from the back of the truck, which will not allow the dog to reach the driver. One of the two storage units will also have food and water dishes. It is important to note that the term "integrated" refers to the interaction between the driver and the pet and not the interaction between the system and the truck. Parts of this system will be usable by non pet owners, and other parts will be easily removable and replaceable to accommodate drivers without pets.

DRAWINGS

Other objects and advantages of the invention will become more apparent upon perusal of the detailed description thereof and upon inspection of the drawings, in which.

DESCRIPTION OF INVENTION

Figure 1:
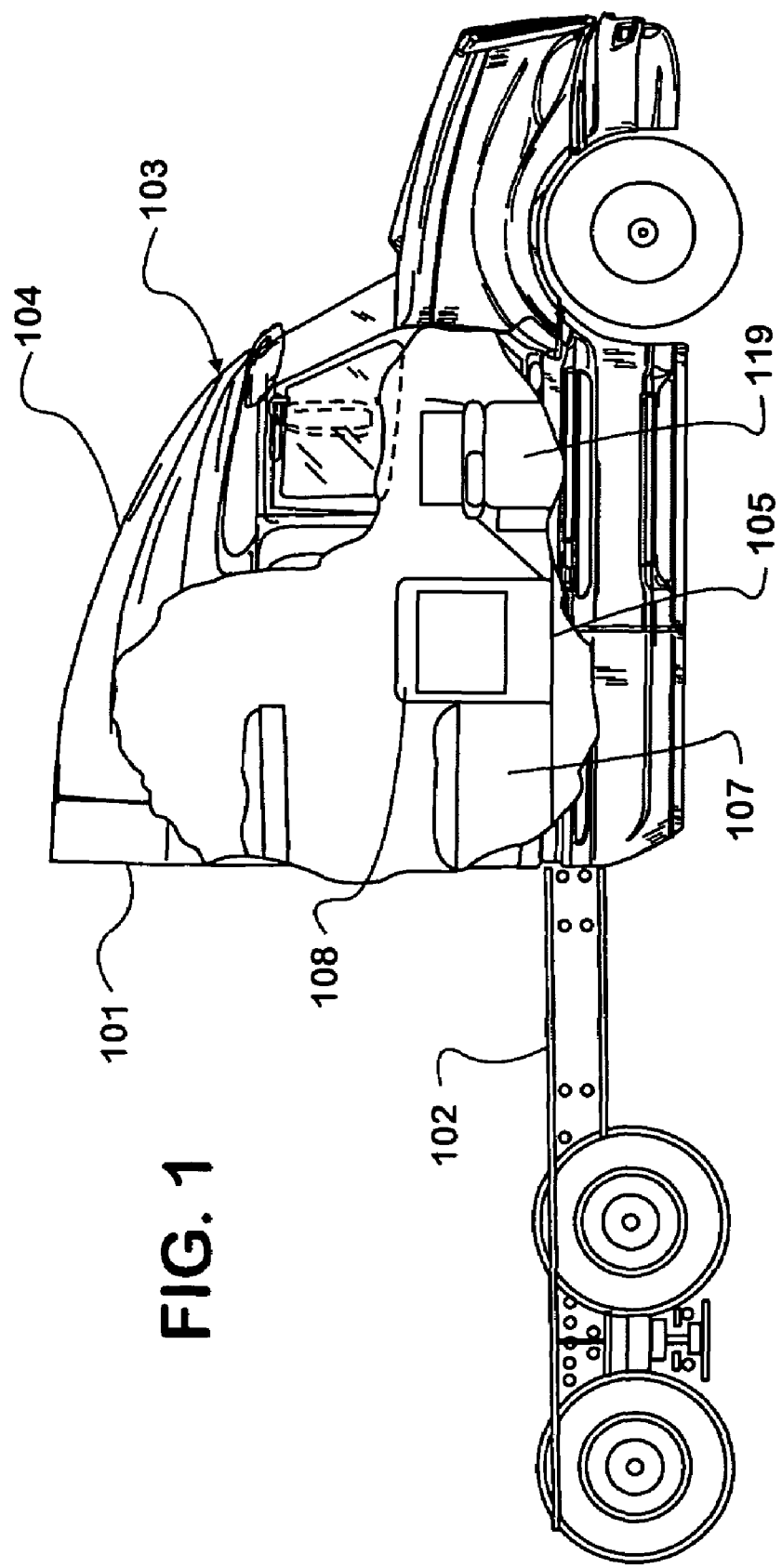
FIG. 1 is a side view of a mobile vehicle with an integrated pet environment system made in accordance with the invention installed.

A motor vehicle 101, specifically a tractor trailer, includes a cab 103 engaged to a drive train bearing chassis 102. For over the road tractors, there will be a sleeper compartment 104 that includes a driver living space. The sleeper compartment 104 and cab 103 include a mounting floor 105 as well as the off duty living space for the driver or drivers. The vehicle 101 shown in FIG. 1 has an integrated pet environment made in accordance with the invention mounted within the sleeper compartment 104 and cab 103. There may be a bunk 107 engaged onto the mounting floor 105 in the rearward portion of the sleeper compartment 104. There may be cabinets 108 mounted on the mounting floor 105. A drivers seat 118 is in a forward portion of the cab 103 mounted to the mounting floor 105.

Figures 2, 3:
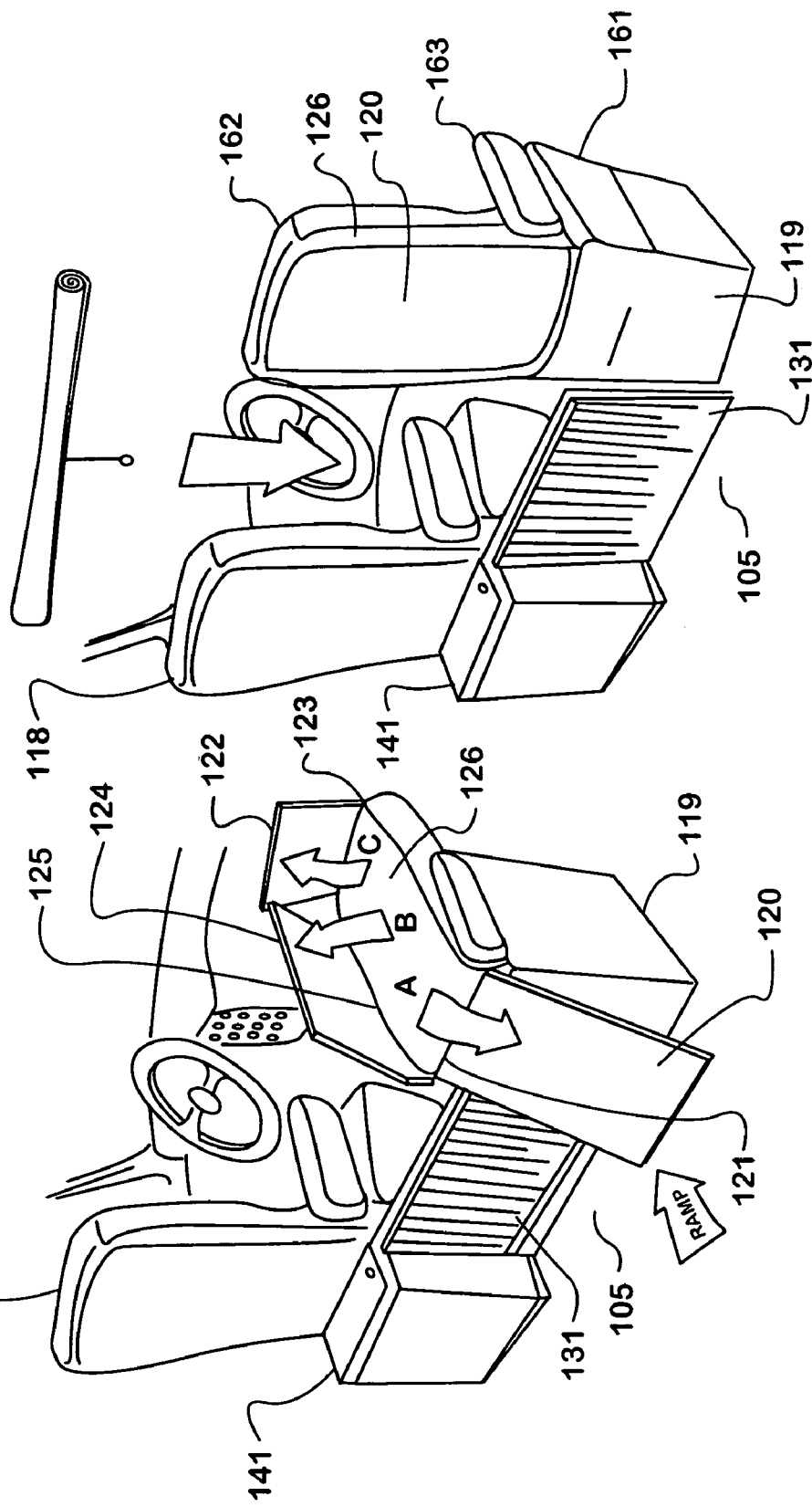
FIG. 2 is a rear perspective view of the integrated pet environment system of the mobile vehicle of FIG. 1 with the combination passenger seat pet rest in a passenger mode.
FIG. 3 is a rear perspective view of the integrated pet environment system of the mobile vehicle of FIG. 1 with the combination passenger seat pet rest in a pet mode.

The integrated pet environment includes a combination passenger seat and pet rest 119 as shown in FIGS. 1 to 4. The combination passenger seat and pet rest 119 consists of a conventional base 161 affixed to the mounting floor 105 in the cab 103 as well as a tiltable vertical portion 162. There also may be arm rests 163 engaged to the base 161. The vertical portion 162 of the combo passenger seat and pet rest 119 may be tilted forward as shown in FIG. 3 from the position shown in FIG. 2. The back surface 126 of the combo passenger seat and pet rest 119 contains a ramp 120 that is engaged by a hinged connection 121. The ramp 120 may fold down in direction A to the mounting floor 105 when the combo passenger seat and pet rest 119 is folded forward in the pet rest mode. A pet 191 may go up the ramp and sit on the back surface 126 being able to both look out the window and be close to the driver 192, hence providing companionship to the driver 192 without being a distraction to the driver.

The combo passenger seat and pet rest 119 may also have side pet guard 124 engaged to the back surface 126 via a hinge 125. There also may be a front pet guard 122 engaged to an upper portion of the back surface 122 via hinged connection 123. The side pet guard 124 and the front pet guard 122 may be folded up in directions B and C respectively when the combo passenger seat and pet rest 119 is folded forward in the pet rest mode. The side pet guard 124 and the front pet guard 122 will inhibit a pet 191 from entering the area immediately around the driver 192.

There may be a pet care unit 141 installed onto the mounting floor 105 in an area rearward of the drivers seat 118. The pet care unit 141 may have a slidable gate 131 engaged on a front side between the pet care unit 141 and the drivers seat 118. A driver 192 may slide the gate 131 across the area between the drivers seat 118 and the combo passenger seat and pet rest 119. The gate 131 can act to even further inhibit a pet 191 to interfere with driving operations as shown in a partially extended position in FIG. 4 and fully extended position in FIGS. 2 and 3.

Figure 4:
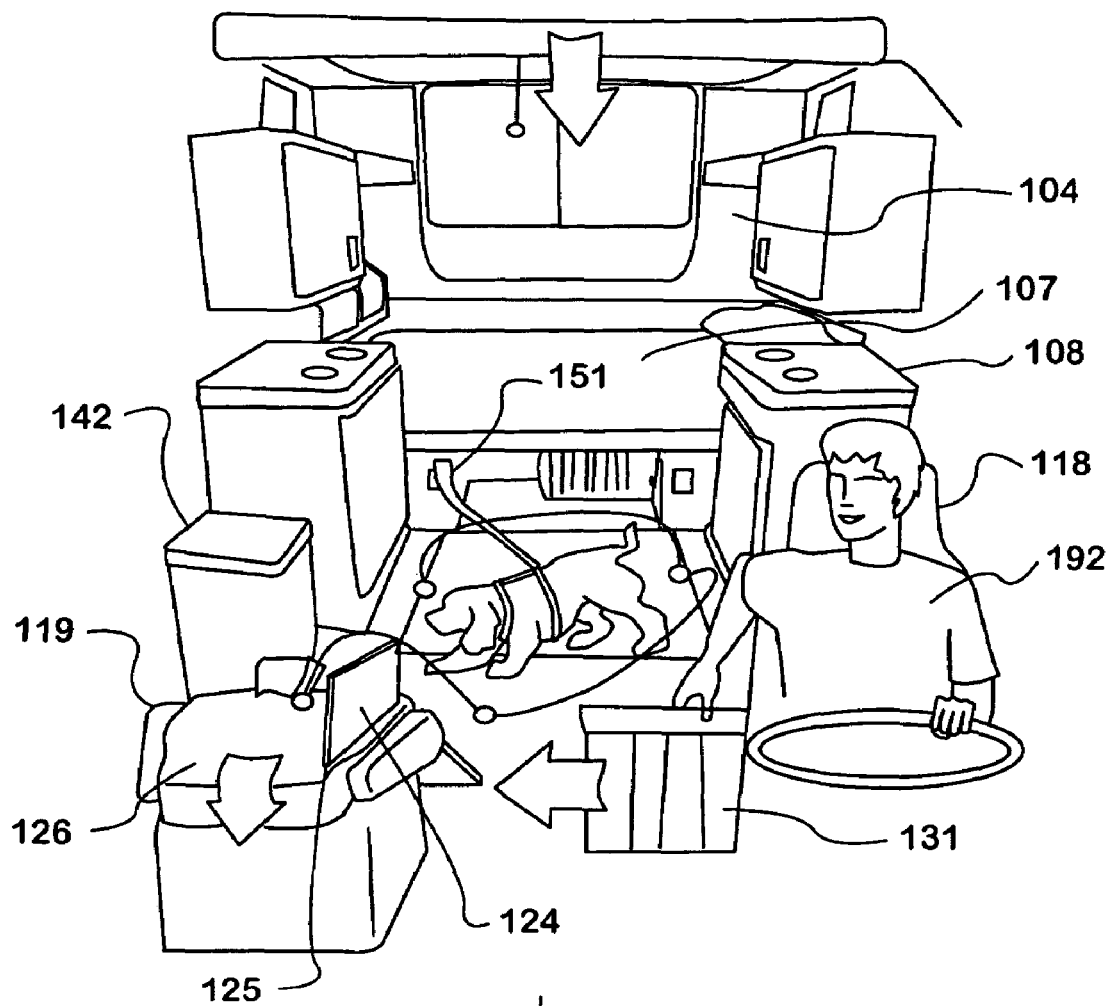
FIG. 4 is a front perspective view of the cab and sleeper compartment of the vehicle of FIG. 1.
Figure 5:
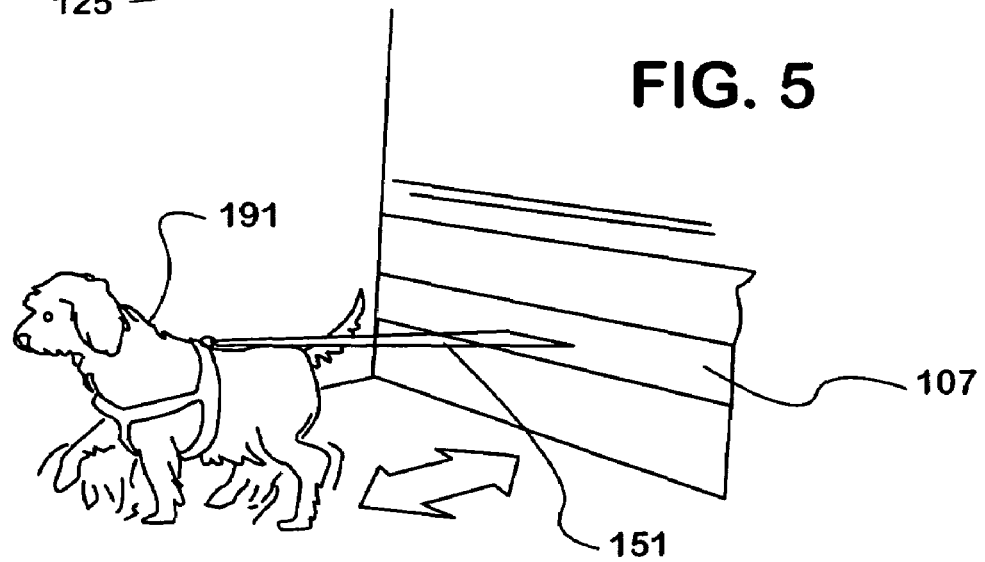
FIG. 5 is a perspective view of a pet tether portion of the integrated pet environment of FIGS. 1 and 4.
Figure 6:
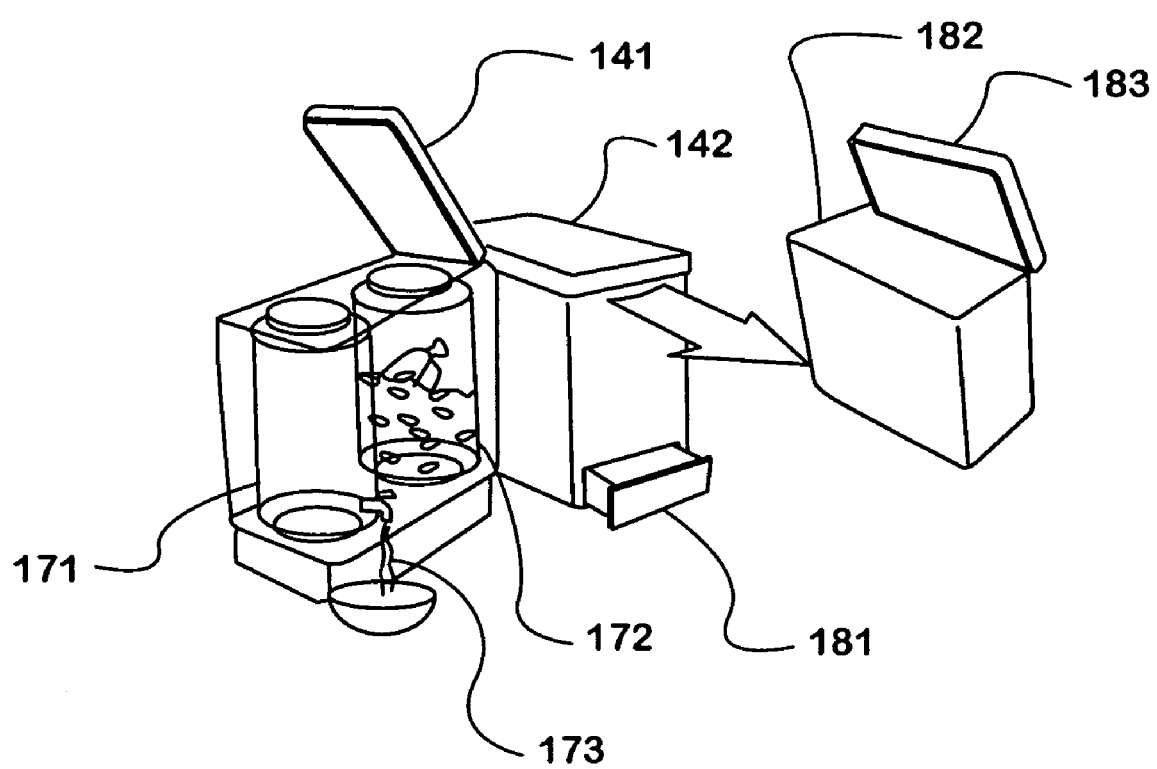
FIG. 6 is a perspective view of the pet care units of the integrated pet environment of FIGS. 2 and 3.

The pet 191 may be secured to a tether 151 that can be engaged to a forward portion of the bunk 107, as shown in FIGS. 4 and 5, or a rearward portion of the sleeper compartment 104.

The pet care unit 141 may include a water dispenser 171 with a spigot 173 for filling a pet bowl as well as a pet food dispenser 172. These enclosures will work to minimize the spread of pet food odors throughout the sleeper 104 and cab 103. An secondary pet care unit 142, shown in FIGS. 4 and 5, may be mounted to the mounting floor 105 and include slidable storage drawer 181 for pet supplies as well as a lid 183 which may allow access to an internal storage area 182.

The Integrated Pet Environment provides a differentiated solution that adds value to fleet, driver, and the driver's pet. It will be the first product on the market that directly addresses the needs to a large demographic of driver population, providing unique benefits not replicable by existing products. We feel this solution can command a price comparable to other premium sleeper options and bundled with current interior trim packages to create the desirable home experience for the Pet Owning Trucker.

The Integrated Pet Environment adds value not only for the fleet, who gains driver safety and an effective recruitment and retention tool, but also adds value for the driver, who can interact with the pet in a safe and controlled environment. Our system reduces driver distraction, while maintaining pet interaction. There are three main stakeholder relationships for which our solution adds value. By providing a truck interior more conducive to traveling with a pet, we hope to motivate fleets to instate a pet policy to help improve driver recruitment and retention. Through the fleet offering a pet policy, we hope to instill a sense of loyalty of a potential user to a particular fleet, regardless of the configuration of the truck, rather dependant on the fact that a pet policy exists. This interaction exploits the enabling features of our system allowing users an improved relationship with their pets while providing the safety that is recommended. The bigger picture here is a truck original equipment manufacturer (OEM) recognizing the humanitarian need of a long-haul driver and the loneliness he or she is likely to face. By catering to this need, a truck OEM will be able to make a broader statement by showing their concern for drivers' quality of life.

The Integrated Pet Environment system has several key components, which all work together. Illustrations of our final concept direction are shown here. Behind each of the two front seats will be a storage system. Both units will have storage for pet food, water, toys, and other supplies. The driver's seat unit will have an integrated pet gate, which will extend from the unit and attach to the passenger's seat. This gate will prevent the pet from approaching the driver, trying to jump on his lap, or interfere with the pedals or gear shift. The passenger's unit will just be storage. One of the two units will have a facility for two bowls, for water and food. The passenger's seat will fold forward to a flat position. The back of the seat will have two short gates which will fold up to block the pet from climbing onto the driver's side or falling forward off the seat. The pet will have full access to the passenger door with the window. The back of the collapsed seat will have a ramp that folds down to allow the pet to climb up onto the seat from the back. This will prevent the necessity of the pet moving between the passenger's and driver's seats. When the pet is on the collapsed passenger's seat, the driver will still have access to the pet without fear that the pet will try to climb onto his lap or interfere with his driving. When there is a human passenger, the passenger's seat will function normally in its upright position. When there is no pet, the back of the passenger's seat will function as a flat working surface. There will also be a harness or tether to protect the pet and keep it safe. The harness will be anchored in the vicinity of the bed in the rear of the cab. This will allow the pet a range of motion between the back of the truck and the passenger's seat, while still being restrained and safe.

The Integrated Pet Environment provides a system that allows drivers to interact with their pets while reducing distraction and increasing safety. The system incorporates the maker demographic which is consistent with most pet owning drivers, in that the system is primarily mechanical. The components are simple and easy to use without the need for complex electronic systems. This is not only more appealing to drivers, but is also less costly. The components described will seamlessly integrate into an environment which is both simple and beneficial to both the driver and the pet.

The harness is the easiest part of our design to justify. According to the Humane Society, the safest way to travel with an animal is to restrain it as if it were a child. A safety harness accomplishes this far better than a barrier alone. It helps prevent an animal from sustaining serious injury during an accident since it prevents it from being ejected from the cab. The harness also helps prevents the pet from reaching the driver when he or she is driving. Finally we feel that the harness will protect the truck OEM from potential liability which may accompany encouraging a pet in the cab, as long as the driver is informed of the potential risks of not using the harness.

The seat back units provide storage in an otherwise unused portion of the truck cab. This provides additional storage without taking up valuable cab space. It also provides a distinct place to store pet supplies which is separate from the human supplies. The integrated pet gate will be made out of wood conveying a feeling of home, whereas most current vehicle pet barriers on the market do not provide this feature.

The collapsible passenger seat not only separates the pet from the driver when driving but also elevates the pet providing him or her with an enhanced view out the passenger side window. It also creates mobility for the pet allowing it to move between the back and front of the cab, while protecting the animal by keeping it harnessed. Folding the passenger seat down also helps increase the resale value since the seat is protected from pet damage. The dog seat will be removable or replaceable when the truck is resold, increasing resale value.

Our Integrated Pet Environment will also allow a truck OEM to enable owner-operators. This is the gap we had such a hard time identifying and designing for. We immediately saw how our product could enable fleets to offer a pet policy. We then realized how enabling fleets would promote their recruitment and retention. Our difficulty was designing a solution we thought the driver would desire using over having no facilitating attributes at all. Without the fleet adding incentive, we had to decide how this will help an OEM sell trucks to the people that would be using them. This meant providing added value to the interaction the driver experiences with his or her pet. Our initial iterations seemed to limit or hinder the interaction of the user and the pet. Our initial goal for the user was to enable and facilitate traveling with a pet. Adding safety by removing the pet from the vicinity of the driver was not enabling a positive interaction between the driver and his or her pet. Our main challenge was how to remove the pet physically from the driver without removing the pet emotionally, thus defeating the whole point of traveling with an animal. We feel that by not physically removing the pet's presence from the driver, the emotional connection is still there as well. Ultimately, however, our solution allows the pet to occupy nearly all of the truck, short of the driver's seat while the truck is in motion. The driver will be able to control where the pet can roam, as well as have visual contact with and audible feedback from the animal at almost all times.

A truck OEM can approach a larger issue of the lifestyle that being a trucker requires. Being a trucker demands long hours and implies a sense of loneliness on the road. Companionship is not terribly common in the trucking industry. Not only will the truck OEM be able to provide a direct benefit to the user (the driver) through the product solution; but by addressing lifestyle conditions that drivers currently face, a truck OEM will also be able to make a broader statement by showing their concern for truck drivers' quality of life. The truck OEM can then lever this position through their advertising and marketing to further express their concern for driver well being. Addressing this basic humanitarian concern may create a value that can assist a truck OEM on many levels and help differentiate them from other truck manufacturers by more than just the product they sell.

As described above, the vehicle made with the integrated pet environment provide a number of advantages, some of which have been described above and others of which are inherent in the invention. Also modifications may be proposed to the vehicle made with the integrated pet environment without departing from the teachings herein.

We claim:

1. A mobile vehicle in combination with an integrated pet environment, comprising:
   a cab engaged to a drive train bearing chassis;
   a sleeper compartment including a driver living space;
   said sleeper compartment including a mounting floor as well as off duty living space for a driver;
   a combination passenger seat and pet rest mounted on said mounting floor within said sleeper compartment;
   said combination passenger seat and pet rest comprising a conventional base affixed to said mounting floor in said cab as well as a tiltable vertical portion engaged to a rearward side of said base, said tiltable vertical portion having a back surface;
   said base having a horizontal passenger surface;
   said vertical portion being tiltable forward from a passenger sitting mode into a horizontal orientation to a pet rest mode wherein said vertical portion overlies said base;
   a ramp that is engaged by a hinged connection with respect to said vertical portion and is foldable against said back surface; and
   said ramp foldable down in direction to said mounting floor when said combination passenger seat and pet rest is folded forward in a pet rest mode allowing pet access to sit on said back surface of said combination passenger seat and pet rest, said ramp engages between said horizontal passenger surface and a combined height of said base and said overlying vertical portion, said hinged connection allowing said ramp to pivot more than 180 degrees with respect to said vertical portion.

2. The mobile vehicle of claim 1, further comprising:
   a side pet guard engaged to said back surface via a hinge;
   a front pet guard engaged to an upper portion of said back surface via a hinged connection;
   said side pet guard and said front pet guard being foldable upwards to provide vertical fencing surfaces when said combination passenger seat and pet rest is folded forward in said pet rest mode to inhibit an animal on said back surface from approaching a driver's seat in said cab.

3. The mobile vehicle of claim 1, further comprising:
   a pet care unit installed onto said mounting floor in an area rearward of said driver's seat;
   said pet care unit having a slidable gate engaged on a front side between said pet care unit and a driver's seat also mounted to said mounting floor;
   said gate slidable across an area between said drivers seat and said combination passenger seat and pet rest such as to inhibit pet movement between said driver's seat and said combination passenger seat and pet rest when said gate is slid into a first position and to allow movement between said drivers seat and said combination passenger seat and pet rest when said gate is slid into a second position.

4. The mobile vehicle of claim 3, wherein:
   said pet care unit includes a water dispenser and a pet food dispenser.

5. A combination passenger seat and pet rest for use in a mobile vehicle with a cab with a mounting floor, comprising:
   a conventional base mountable to a mounting floor in a cab;
   said base having a horizontal passenger surface;
   a tiltable vertical portion engaged to a rearward side of said base, said tiltable vertical portion having a back surface;
   said vertical portion being tiltable forward from a passenger sitting mode into a horizontal orientation to a pet rest mode wherein said vertical portion overlies said base;
   a ramp engaged by a hinged connection with respect to said vertical portion and is foldable against said back surface; and
   said ramp foldable down in direction to a mounting floor when said combination passenger seat and pet rest is folded forward in a pet rest mode allowing pet access to sit on said back surface of said combination passenger seat and pet rest, said ramp engages between said horizontal passenger surface and a combined height of said base and said overlying vertical portion, said hinged connection allowing said ramp to pivot more than 180 degrees with respect to said vertical portion.

6. The combination passenger seat and pet rest of claim 5, further comprising:
   a side pet guard engaged to said back surface via a hinge;
   a front pet guard engaged to an upper portion of said back surface via a hinged connection;
   said side pet guard and said front pet guard being foldable upwards to provide vertical fencing surfaces when said combination passenger seat and pet rest is folded forward in said pet rest mode to inhibit an animal on said back surface from approaching a drivers seat in said cab.

7. The mobile vehicle of claim 1, further comprising:
   at least one pet guard deployable upwards from said back surface to provide vertical fencing surfaces when said combination passenger seat and pet rest is folded forward in said pet rest mode to inhibit an animal on said back surface from approaching a drivers seat in said cab.

8. The combination passenger seat and pet rest of claim 5, further comprising:
   at least one pet guard deployable upwards from said back surface to provide vertical fencing surfaces when said combination passenger seat and pet rest is folded forward in said pet rest mode to inhibit an animal on said back surface from approaching a drivers seat in said cab.

9. A combination passenger seat and pet rest for use in a mobile vehicle with a mounting floor, comprising:
   a base mountable to a mounting floor in the vehicle;
   said base having a horizontal passenger surface;
   a tiltable back rest portion engaged to a rearward side of said base, said tiltable back rest portion having a back surface;

said back rest portion being tiltable forward from a passenger sitting mode into a horizontal orientation to a pet rest mode wherein said back rest portion overlies said base; and a ramp extending from a rearward side of said back surface, when said back rest portion is in said pet rest mode, down at an angle to a position near the mounting floor, allowing a pet to walk up said ramp to sit on said back surface of said tiltable back rest portion, said ramp engages between said horizontal passenger surface and a combined height of said base and said overlying back rest portion.

10. The combination passenger seat and pet rest for use in a mobile vehicle according to claim 1, wherein said ramp is pivotally attached to said tiltable back rest.

11. The combination passenger seat and pet rest for use in a mobile vehicle according to claim 9, wherein said ramp is pivotally attached to said tiltable back rest and is pivotally movable to fold flat against said back rest when said back rest is in a passenger sitting mode.

12. The combination passenger seat and pet rest for use in a mobile vehicle according to claim 9, further comprising at least one pet guard wall that is deployable upward from said tiltable back rest when said back rest is in said pet rest mode to inhibit movement of the pet off the back surface.

13. The combination passenger seat and pet rest for use in a mobile vehicle according to claim 9, further comprising a front pet guard wall and a side pet guard wall that are both deployable upward from said tiltable back rest when said back rest is in said pet rest mode to inhibit movement of the pet off the back surface.

14. The combination passenger seat and pet rest for use in a mobile vehicle according to claim 13, wherein said front and side pet guard walls allow visual observation of the pet by the driver of the vehicle.

15. The combination passenger seat and pet rest for use in a mobile vehicle according to claim 13, wherein said front and side pet guard walls are pivotally fastened to said tiltable back rest.

\* \* \* \* \*